(12) United States Patent
Iwata et al.

(10) Patent No.: US 7,913,547 B2
(45) Date of Patent: Mar. 29, 2011

(54) ENGINE ROTATING METER

(75) Inventors: Masao Iwata, Yokosuka (JP); Fumitake Matsuda, Yokosuka (JP); Toshiyuki Takano, Yokosuka (JP); Atsushi Kawahara, Yokosuka (JP)

(73) Assignee: Oppama Industry Co., Ltd., Kanagawa (JP)

( * ) Notice: Subject to any disclaimer, the term of this patent is extended or adjusted under 35 U.S.C. 154(b) by 56 days.

(21) Appl. No.: 12/295,161

(22) PCT Filed: Apr. 6, 2006

(86) PCT No.: PCT/JP2006/307327
§ 371 (c)(1),
(2), (4) Date: Sep. 29, 2008

(87) PCT Pub. No.: WO2007/113917
PCT Pub. Date: Oct. 11, 2007

(65) Prior Publication Data
US 2009/0165541 A1 Jul. 2, 2009

(51) Int. Cl.
*G01M 15/04* (2006.01)
(52) U.S. Cl. .................... 73/114.25; 73/114.63
(58) Field of Classification Search .......... 73/114.25, 73/114.29; 324/160
See application file for complete search history.

(56) References Cited

U.S. PATENT DOCUMENTS

| | | | | |
|---|---|---|---|---|
| 3,811,089 A * | 5/1974 | Strzelewicz | ......... | 324/170 |
| 3,886,450 A * | 5/1975 | Trussell et al. | ......... | 324/170 |
| 4,059,799 A * | 11/1977 | Faria | ......... | 324/169 |
| 4,070,613 A * | 1/1978 | Brady | ......... | 324/392 |
| 4,221,126 A * | 9/1980 | Cordiano | ......... | 73/114.25 |
| 4,587,838 A * | 5/1986 | Sakai et al. | ......... | 73/116.01 |
| 4,843,580 A * | 6/1989 | Ridoux et al. | ......... | 702/79 |
| 5,043,659 A * | 8/1991 | Lowmiller et al. | ......... | 324/160 |
| 5,151,654 A * | 9/1992 | Krzywicki et al. | ......... | 324/160 |
| 5,497,092 A * | 3/1996 | Kaszanics | ......... | 324/402 |
| 5,883,510 A * | 3/1999 | Torre et al. | ......... | 324/160 |
| 7,497,910 B2 * | 3/2009 | Mey et al. | ......... | 118/623 |
| 7,726,181 B2 * | 6/2010 | Iwata et al. | ......... | 73/114.63 |
| 2008/0303513 A1 * | 12/2008 | Turner | ......... | 324/160 |

FOREIGN PATENT DOCUMENTS

| | | | |
|---|---|---|---|
| JP | 51-153328 | | 12/1976 |
| JP | 56-155858 | | 12/1981 |
| JP | 59-72048 | | 5/1984 |
| JP | 59-162459 | | 9/1984 |
| JP | 59162459 | * | 9/1984 |
| JP | 02-165736 | | 6/1990 |
| JP | 07-106995 | | 4/1995 |
| JP | 10-022943 | | 1/1998 |
| JP | 2006-258590 | | 9/2006 |
| JP | 2006-262032 | | 9/2006 |

* cited by examiner

*Primary Examiner* — Freddie Kirkland, III
(74) *Attorney, Agent, or Firm* — Pillsbury Winthrop Shaw Pittman LLP (57) ABSTRACT

A level adjusting circuit which adjusts input pulses from an antenna to a level suitable for determining the number of engine revolutions, is connected in a circuit that connects the antenna with a determining circuit. An optimum adjustment of the determination level by manual operation allows the pulses inputted to the determining circuit to be precisely determined at all times.

11 Claims, 8 Drawing Sheets

Fig. 1

2 : INPUT CIRCUIT   3 : WAVEFORM SHAPING CIRCUIT
4 : ARITHMETIC CIRCUIT   5 : DISPLAY DEVICE

2 : INPUT CIRCUIT   3 : WAVEFORM SHAPING CIRCUIT
4 : ARITHMETIC CIRCUIT   5 : DISPLAY DEVICE

ENGINE ROTATING METER

CROSS REFERENCE TO RELATED APPLICATIONS

This is the U.S. National Phase of PCT/JP2006/307327, filed Apr. 6, 2006 the contents of which is incorporated herein by reference herein in its entirety.

TECHNICAL FIELD

The present invention relates to an engine rotating meter for measuring an engine speed based on an electromagnetic wave pulse detected by an antenna, and more particularly, to an engine rotating meter having an input level of the electromagnetic wave adjusted to the level suitable for the engine speed measurement.

BACKGROUND ART

In general, an engine rotating meter for measuring the engine speed of an automobile or a motorbike is structured to induce the electromagnetic wave generated in an engine ignition system so as to be detected, and to extract and count the pulse corresponding to the engine speed from the noise pulse contained in the detected induction electromagnetic wave (for example, see Patent Document 1).

Figure 5:
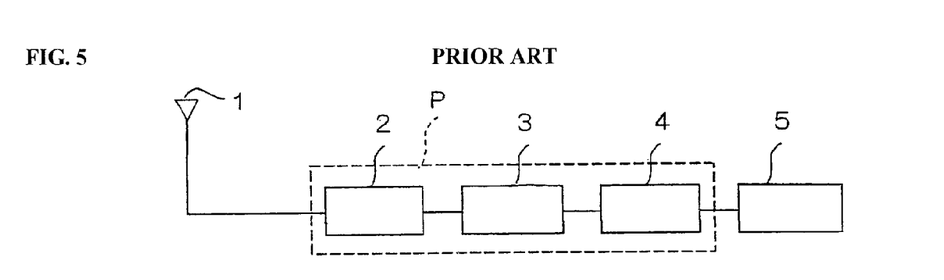
FIG. 5 is a block diagram showing a generally employed engine rotating meter.

The known engine rotating meter as described above includes an antenna 1, an input circuit 2, a waveform shaping circuit 3, and an arithmetic circuit 4 as shown in FIG. 5. The input circuit 2, the waveform shaping circuit 3 and the arithmetic circuit 4 constitute a measurement processing circuit P.

In the engine rotating meter, the antenna 1 induces the electromagnetic wave generated from the ignition system of the engine to be detected, and transmits the pulse corresponding to the ignition timing of the engine among those derived from the antenna 1 to the input circuit 2. The pulse wave transmitted to the input circuit 2 is shaped into a rectangular wave in the waveform shaping circuit 3. The arithmetic circuit 4 calculates the engine speed based on the thus shaped rectangular wave pulse, and the calculated engine speed is displayed on a display device 5.

Generally, the engine output varies depending on the usage in the industrial field, for example, an automobile, a motorbike, a grass cutter and the like, and accordingly, the output energy or the frequency of the electromagnetic wave generated from the ignition system of the engine varies depending on the type of the machine. A level of the input pulse corresponding to the engine speed input to the measurement processing circuit P of the engine rotating meter may also differ.

Figure 6:
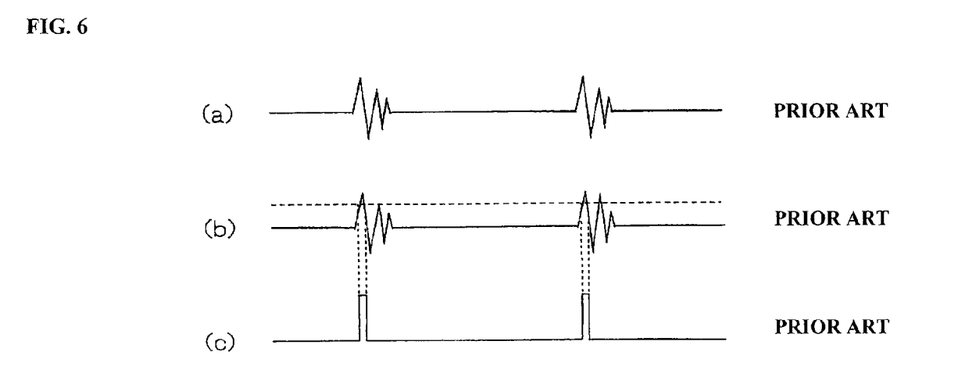
FIG. 6 represents timing charts each showing the pulse waveform of the respective blocks shown in FIG. 5.

In the case where the electromagnetic wave generated in the ignition system of the engine is at a high level, and accordingly, the level of the pulse input to the input circuit 2 is high as shown in FIG. 6(*a*), the level of the pulse input to the waveform shaping circuit 3 also becomes high as shown in FIG. 6(*b*). In the aforementioned case, besides the pulses required to be counted, the unnecessary adjacent pulse generated at the ignition timing of the engine as noise may be waveform-shaped in the waveform shaping circuit 3 simultaneously.

FIG. 6(*c*) is a chart indicating the case where two pulses are incorrectly waveform-shaped at a single ignition timing of the engine. As the engine speed is obtained based on the count values of the two pulses in the arithmetic circuit 4, the calculated engine speed is inaccurate, thus deteriorating the reliability of the engine rotating meter. The aforementioned generally employed engine rotating meter may accidentally count the external electromagnetic wave noise at high frequency, which is not originated from the engine ignition.

The large capacitance measurement processing circuit is preliminarily provided in order to withstand abnormally high input level or high input frequency. This case inevitably causes the circuit structure to be complex and the production cost to be increased.

Meanwhile, upon measurement of the engine speed, the input sensitivity of the electromagnetic wave is adjusted by moving the antenna to be close to or away from the point from where the electromagnetic wave is generated while observing (monitoring) the engine speed displayed on the display device of the engine rotating meter so as to prevent the input pulse level from becoming excessively high.

Patent Document 1: Japanese Unexamined Patent Application Publication No. 9-113522

DISCLOSURE OF INVENTION

However, it is difficult for the aforementioned sensitivity adjustment to allow the antenna to be kept in position constantly through the manual operation, thus failing to provide correct measurements owing to fluctuation in the measurement values of the engine speed.

The present invention provides an engine rotating meter with low cost and simple structure, which allows the number of input pulses generated by the ignition to be correctly counted through the optimum adjustment of the measurement level by manually operating a main body of the engine rotating meter so as to allow the engine speed to be automatically measured accurately instead of adjusting the sensitivity by operating the antenna.

The present invention provides an engine rotating meter including an antenna which induces and detects an electromagnetic wave generated in an ignition system of an engine, and a measurement processing circuit which measures an engine speed based on a pulse of the electromagnetic wave detected by the antenna. A level adjustment circuit which adjusts the electromagnetic wave from the antenna to a level suitable for performing a measurement processing of the engine speed is connected to an intermediate point of a circuit which connects the antenna and the measurement processing circuit.

In the structure, when the measurement processing circuit processes the input pulse corresponding to the engine speed input from the antenna, the level adjustment circuit prevents the unnecessary noise pulse from being input to the measurement processing circuit. This makes it possible to prevent the measurement processing circuit from incorrectly measuring the engine speed.

In the engine rotating meter according to the present invention, the level adjustment circuit is formed of a variable resistance connected to a point between the circuit which connects the antenna and the measurement processing circuit, and a ground.

In the structure, the variable resistance is manually operated to eliminate the unnecessary high level noise pulse, and to input only the pulse corresponding to the engine speed to the count processing circuit. The use of the single variable resistance allows the level adjustment of the electromagnetic wave from the antenna to be easily performed at low costs.

In the engine rotating meter according to the present invention, the level adjustment circuit is formed of a variable capacitor connected to a point between the circuit which connects the antenna and the measurement processing circuit, and a ground.

In the structure, the variable capacitor is manually operated to eliminate the unnecessary noise pulse at high level and high frequency, and to input only the input pulse corresponding to the engine speed to the count processing circuit. The use of the single variable capacitor allows the level adjustment of the electromagnetic wave from the antenna to be easily performed at low costs.

In the engine rotating meter according to the present invention, the level adjustment circuit is formed of a variable resistance and a capacitor which are connected to a point between the circuit which connects the antenna and the measurement processing circuit, and a ground.

In the structure, the variable resistance is manually operated to eliminate the unnecessary noise pulse at high level and high frequency, and to input only the pulse corresponding to the engine speed to the count processing circuit. The use of the single variable resistance and the single variable capacitor allows the level adjustment of the detection output from the antenna to be easily performed at low costs.

The antenna includes an electromagnetic wave receiving section with an electromagnetic wave receiving surface larger than that of other component so as to be moved adjacent to an engine ignition system, and an antenna lead having a leading end connected to the electromagnetic wave receiving section to lead a signal derived from an induction detection.

In the structure, the electromagnetic wave receiving section has a large wave receiving surface for receiving the electromagnetic wave generated in the ignition system of the engine such that the electromagnetic wave is efficiently converted into the high level electric signal. Such signal may be transmitted to the count processing circuit with respect to the engine speed via the antenna lead.

The electromagnetic wave receiving section may be formed of a conductive plate attached to the leading end of the antenna lead.

In the structure, the electromagnetic wave generated in the ignition system may be efficiently received by the large conductive plate such that the sensitivity for detecting the engine speed is markedly improved.

The electromagnetic wave receiving section may be formed by shaping the leading end of the antenna lead into a loop with a diameter substantially the same as that of an ignition coil for generating the electromagnetic wave.

In the structure, the electromagnetic wave generated around the ignition coil functions as a coil with a single turn so as to bring the loop-like portion into the high level state corresponding to the engine ignition timing, thus markedly improving the detection sensitivity with respect to the engine speed.

The electromagnetic wave receiving section may be attached to the leading end of the antenna lead such that an area of an electromagnetic wave receiving surface is adjustable.

The structure allows the antenna to be easily stored and carried, and the electromagnetic wave to be captured over a wide range, thus improving the wave receiving sensitivity.

The electromagnetic wave receiving section may be attached to the leading end of the antenna lead such that an angle in a wave receiving direction is adjustable.

In the structure, the electromagnetic wave receiving section may be directed to the position where the electromagnetic wave is detected with the highest sensitivity.

The electromagnetic wave receiving section may be formed of a conductive suction cup attached to the leading end of the antenna lead.

In the structure, the conductive suction cup efficiently receives the electromagnetic wave so as to be easily stuck to the main cover or other component of the engine. The aforementioned conductive suction cup may be the commercial one to which the conductive coating material has been applied or deposited.

An antenna jack connectable to a socket formed in a body of the engine rotating meter for inputting a signal at an end of the antenna lead opposite an end where the electromagnetic wave receiving section may be provided.

In the structure, the end of the antenna lead may be electrically coupled with the signal input socket in a body of the rotating meter easily so as not to be removed.

In the present invention, the electromagnetic wave receiving section of the antenna is fixed to the electromagnetic wave measurement position so as to allow the level adjustment circuit to input only the pulse corresponding to the engine speed in excess of the set level among those of the electromagnetic wave captured by the antenna to the measurement processing circuit. Accordingly, the measurement value (arithmetic value) of the engine speed processed by the measurement processing circuit becomes high quality sufficient to be displayed on the display device as the highly reliable value of the engine speed.

BEST MODE FOR CARRYING OUT THE INVENTION

Figure 1:
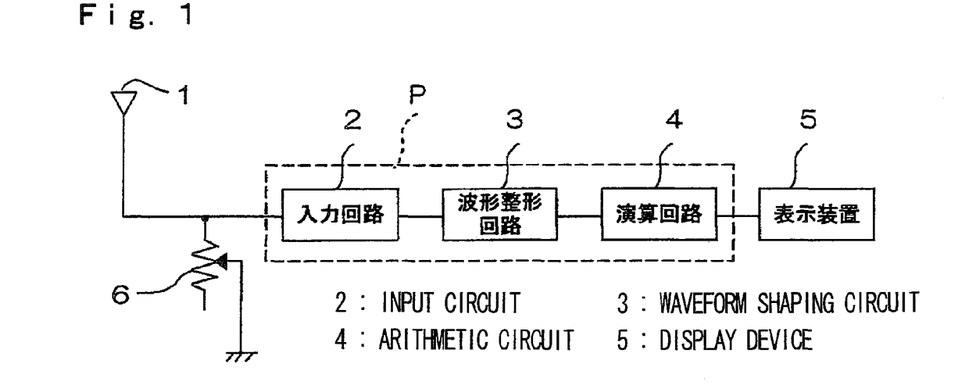
FIG. 1 is a block diagram showing an engine rotating meter according to an embodiment of the present invention.

Embodiments of the present invention will be described in detail referring to the drawings. FIG. 1 is a block diagram showing an engine rotating meter according to the embodiment of the present invention. The engine rotating meter includes an antenna 1, an input circuit 2, a waveform shaping circuit 3, an arithmetic circuit 4, and a display device 5. The input circuit 2, the waveform shaping circuit 3 and the arithmetic circuit 4 constitute a measurement processing circuit P for measuring the engine speed.

The antenna 1 is disposed around an engine ignition system for generating the electromagnetic wave pulse corresponding to the engine speed upon its measurement. For example, it is fixed around an ignition plug or a high pressure current circuit for supplying the high pressure current to the ignition plug with a clip. An antenna lead formed only of a lead cable or the element formed by connecting the antenna lead end to the electromagnetic wave receiving section such as the conductive plate or the conductive bar may be employed as the antenna 1.

The input circuit 2 functions in processing the pulse suitable for waveform-shaping of the input pulse corresponding to the engine speed among the electromagnetic wave pulses induced by the antenna 1. The waveform shaping circuit 3 functions in waveform-shaping the pulse output from the input circuit 2 into the rectangular wave.

The arithmetic circuit 4 counts the waveform-shaped rectangular pulses, and calculates the engine speed by multiplying the count value by the constant. The display device 5 displays the calculated engine speed on the display screen such as the liquid crystal display.

In an embodiment of the present invention, a variable resistance 6 which adjusts the electromagnetic wave pulse from the antenna 1 into the level suitable for measuring the engine speed is connected as a level adjusting circuit to a point between the ground and the circuit for connecting the antenna 1 and the input circuit 2.

In the above-structured engine rotating meter, the electromagnetic wave pulse generated in the engine ignition system is induced and detected by the antenna 1 so as to be input to the measurement processing circuit P. The pulse input to the input circuit 2 is processed into the pulse with the waveform suitable for the waveform-shaping, and input to the waveform shaping circuit 3.

The waveform shaping circuit 3 shapes the processed pulse into the rectangular wave pulse so as to be transmitted to the arithmetic circuit 4. The arithmetic circuit 4 counts the waveform-shaped pulses, and calculates the engine speed by multiplying the count value by the constant (for example, the constant determined by the number of poles for engine speed measurement). The thus calculated engine speed is displayed on the display device 5.

In the aforementioned case, as the electromagnetic wave pulse generated at the engine ignition timing is at the high level, the level of the pulse input from the antenna 1 to the input circuit 2 becomes high. In the present invention, the user is allowed to easily adjust the variable resistance 6 by dialing while monitoring the display of the display device 5 of the engine rotating meter.

If the input level of the electromagnetic wave displayed on the display device 5 is excessively high, the dialing is performed to increase the resistance value of the variable resistance 6. As a result, the level of the pulse input to the input circuit 2 as shown in FIG. 2(*a*) is kept low as shown in FIG. 2(*b*).

Figure 2:
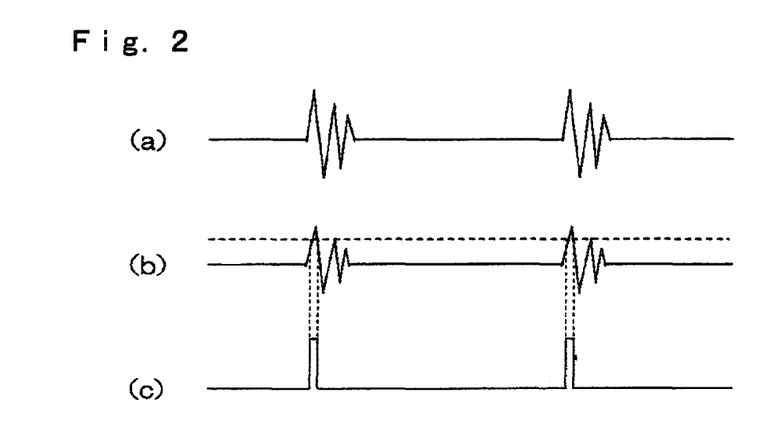
FIG. 2 represents timing charts each showing a pulse waveform of the respective blocks shown in FIG. 1.

Among the input pulses which have been subjected to the level adjustment, only one of pulses at the highest level is selected such that the waveform shaping circuit 3 outputs the single rectangular wave pulse corresponding to the ignition timing as shown in FIG. 2(*c*). A plurality of fixed resistances each with the different resistance value may be selectively connected using a rotary switch between the antenna 1 and the ground in place of the variable resistance 6, which may provide the similar functions and effects.

Figure 3:
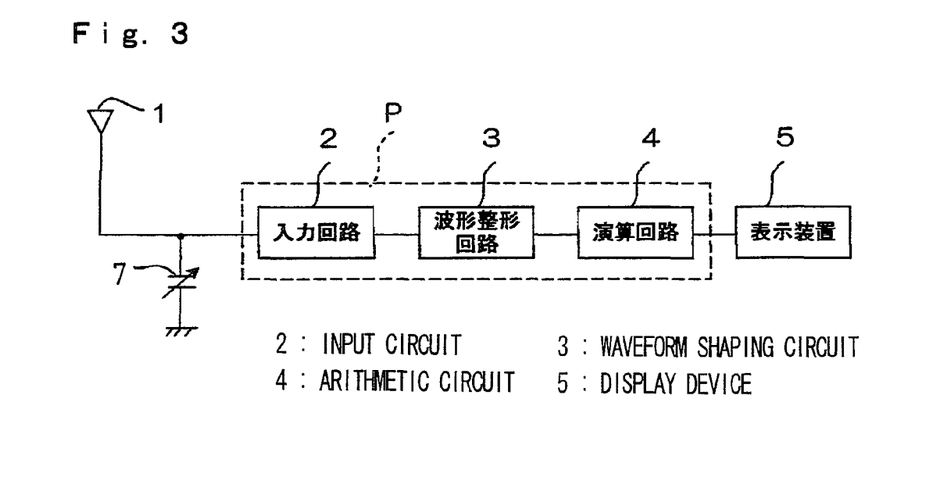
FIG. 3 is a block diagram showing an engine rotating meter according to another embodiment of the present invention.

FIG. 3 is a block diagram showing another embodiment of the engine rotating meter. In the embodiment, a variable capacitor 7 is connected to a point between the circuit for connecting the antenna 1 and the input circuit 2, and the ground.

The variable capacitor 7 is capable of eliminating the unnecessary noise pulse at the frequency in excess of the set frequency among those input through the antenna 1, and suppressing the peak of the input pulse to the low level using the integral effect.

Accordingly, only the pulse at the predetermined level corresponding to the ignition timing may be transmitted to the input circuit 2 of the measurement processing circuit P. Only the rectangular wave pulse corresponding to the engine ignition timing may be counted by the arithmetic circuit 4 to calculate further accurate engine speed so as to be displayed on the display device 5. Instead of the variable resistance, the selector switch (not shown) may be used to drop the output of the antenna 1 to the ground via the capacitor 7 only when turning the switch ON. This makes it possible to eliminate the noise pulse in the unnecessary frequency range in excess of the set frequency.

Figure 4:
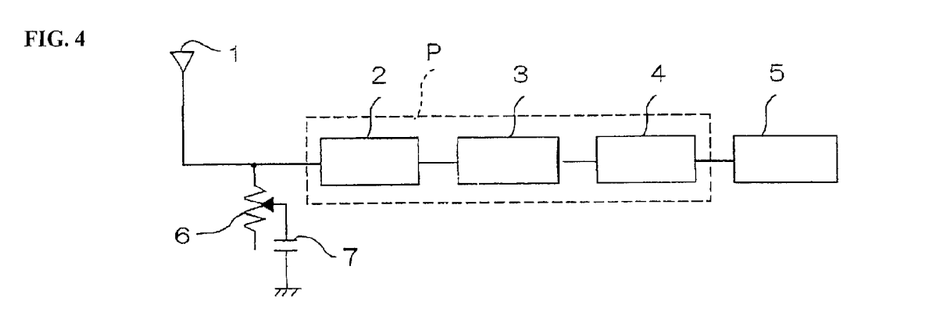
FIG. 4 is a block diagram showing an engine rotating meter according to another embodiment of the present invention.

In another embodiment of the engine rotating meter, the circuit of the variable resistance 6 and the capacitor 7 in series (or parallel circuit) may be connected to a point between the ground and the circuit for connecting the antenna 1 and the input circuit 2 as shown in FIG. 4. This makes it possible to avoid transmission of the unnecessary pulse at the high level in excess of the set frequency among those induced to the input circuit 2 via the antenna 1 to the measurement processing circuit P.

In the aforementioned case, the variable resistance 6 and the capacitor 7 may be connected in parallel. The capacitance of the capacitor 7 is arbitrarily selected to widen the frequency region of the unnecessary pulse to be eliminated. As a result, the arithmetic circuit 4 is allowed to count only the rectangular wave pulse corresponding to the engine ignition timing to calculate further accurate engine speed so as to be displayed on the display device 5.

The level adjusting circuit 6 for adjusting the input pulse from the antenna to the level suitable for the engine speed measurement is connected to an intermediate point of the circuit for connecting the antenna 1 and the measurement processing circuit P. The accurate input pulse to the measurement processing circuit P including the waveform shaping circuit 3 may be constantly detected by performing the optimum adjustment of the measurement level through the manual operation at the main body of the engine rotating meter, resulting in the accurately measured engine speed.

Figure 7:
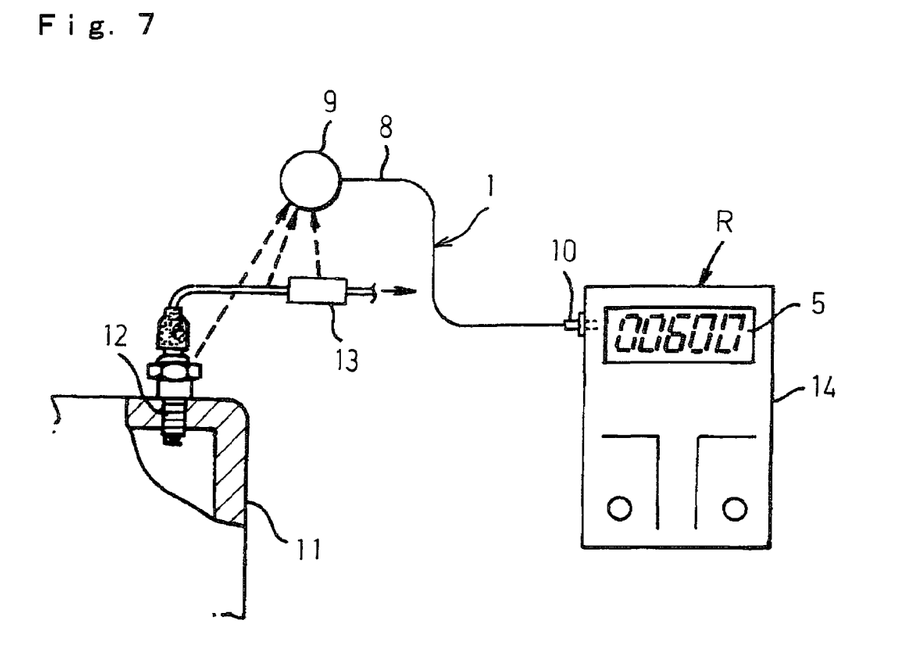
FIG. 7 is an appearance view showing the use of the antenna of the engine rotating meter according to the embodiment of the present invention.

FIG. 7 representing the use of the above-structured engine rotating meter R shows the antenna 1, an electromagnetic wave receiving section 9 which is larger than an antenna lead 8 formed at one end thereof, and an antenna jack 10 at the other end. An engine 11 includes an ignition plug 12 connected to a not shown ignition control circuit via a high voltage current generation section 13.

The engine rotating meter R includes an induction coil for inducing the electromagnetic wave inside a plastic case 14 so as to shape the current pulse waveform obtained by the induction coil, count the pulses, and calculate in accordance with the electromagnetic waves such that the resultant engine speed is displayed on the display device 5.

The antenna lead 8 is formed of the low electric-resistive material, for example, a flexible electric wire or a rigid conductive wire. The antenna jack 10 is electrically coupled with one end of the antenna lead 8, which is detachably inserted into a not shown socket formed in the case 14 of the engine rotating meter R. The socket is connected to the induction coil (not shown) in the case 14.

Meanwhile, the electromagnetic wave receiving section 9 is electrically coupled with the leading end of the antenna lead 8, or integrally provided therewith. More specifically, it is formed as shown in the drawings from FIGS. 8 to 15. Each of those electromagnetic wave receiving sections 9 is disposed so as to be manually accessible around the ignition plug 12 or the high pressure current generation section 13 of the engine 11 for efficiently inducing and detecting the electromagnetic wave which leaks therefrom. The electromagnetic wave receiver section 4 is structured to have a large wave receiving area or a large wave receiving space.

The electromagnetic wave also leaks from the area around the cable which connects the ignition plug 12 and the high pressure current generation section 13.

Figure 8:
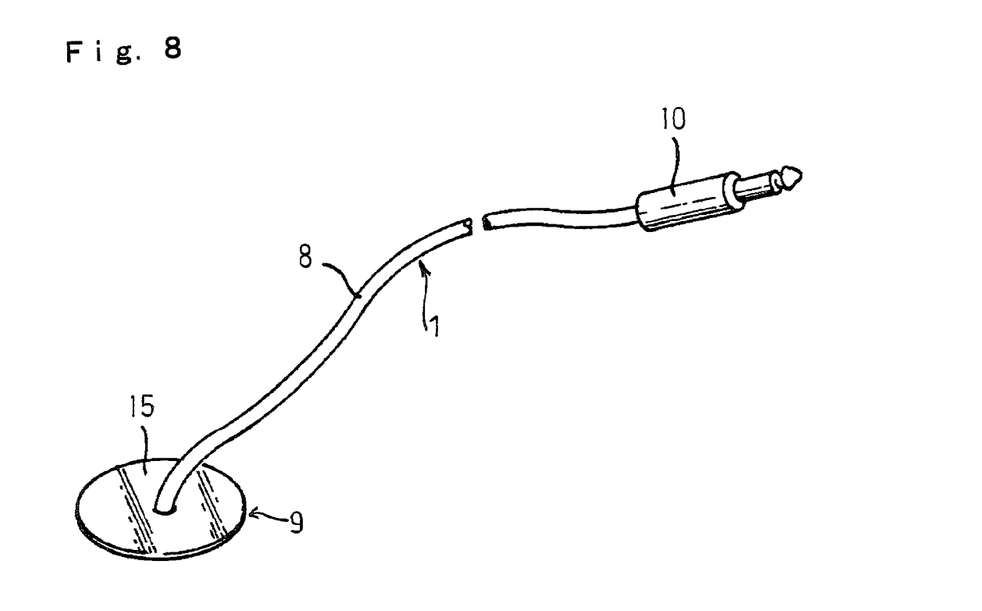
FIG. 8 is a perspective view showing an antenna according to an embodiment of the present invention.

FIG. 8 shows an embodiment of the antenna including the antenna jack 10 as well as the antenna lead 8 and the electromagnetic wave receiving section 9. The electromagnetic wave receiving section 9 is formed as a conductive plate 15 attached to the leading end of the rigid antenna lead 8.

The conductive plate 15 has a disk shape with the center connected to the leading end of the antenna lead 8 through welding or soldering. The conductive plate 15 may be formed of a plastic plate having a surface on which a conductive film is applied through plating or depositing so as to be electrically or mechanically connected to the leading end of the antenna lead 8.

The wave receiving surface area of the conductive plate 15 is set to be large in accordance with the size of the electromagnetic wave generation section for sufficiently capturing the electromagnetic wave with efficiency.

When the engine rotating meter R is used to measure the engine speed, the user inserts the antenna jack 10 of the antenna into the socket of the case 14, and manually moves the antenna lead 8 such that the conductive plate 15 at the leading end to be adjacent to the ignition plug 12, the high pressure current generation section 13 or the cable for connecting those components.

The electromagnetic wave generated by the high pressure current generation section 13 is efficiently received by the conductive plate 15 with a large wave receiving area. The pulse corresponding to the electromagnetic wave is applied to the induction coil inside the case 14 via the antenna lead 8 and the antenna jack 10.

The measurement processing circuit P in the case 14 performs the wave-shaping of the pulse to calculate the engine speed so as to be displayed on the display device 5. In the embodiment, the large conductive plate 15 receives the electromagnetic wave so as to markedly improve the detection sensitivity with respect to the engine speed.

Figure 9:
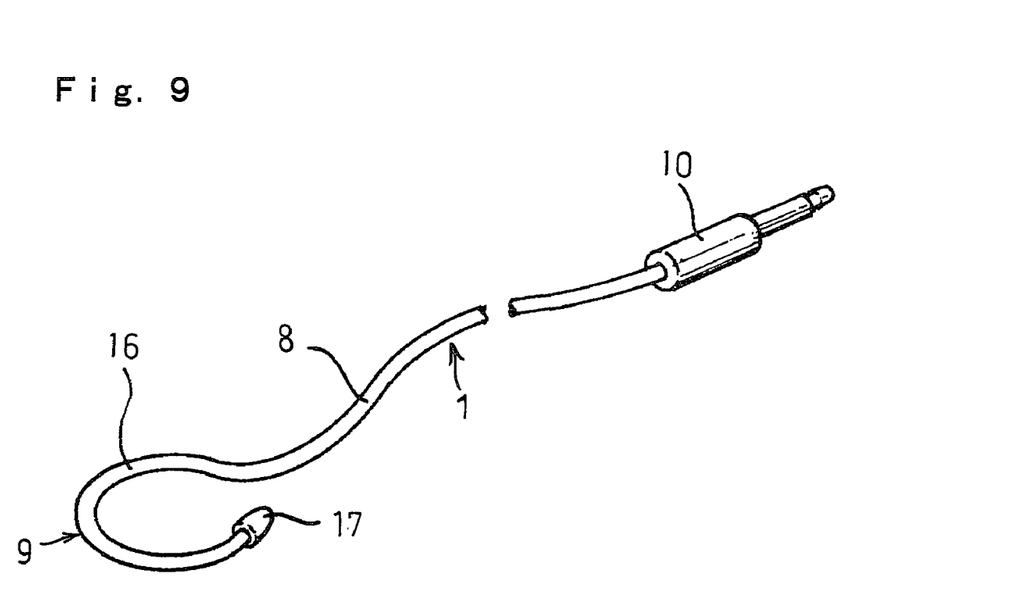
FIG. 9 is a perspective view showing a receiver antenna according to another embodiment of the present invention.
Figure 10:
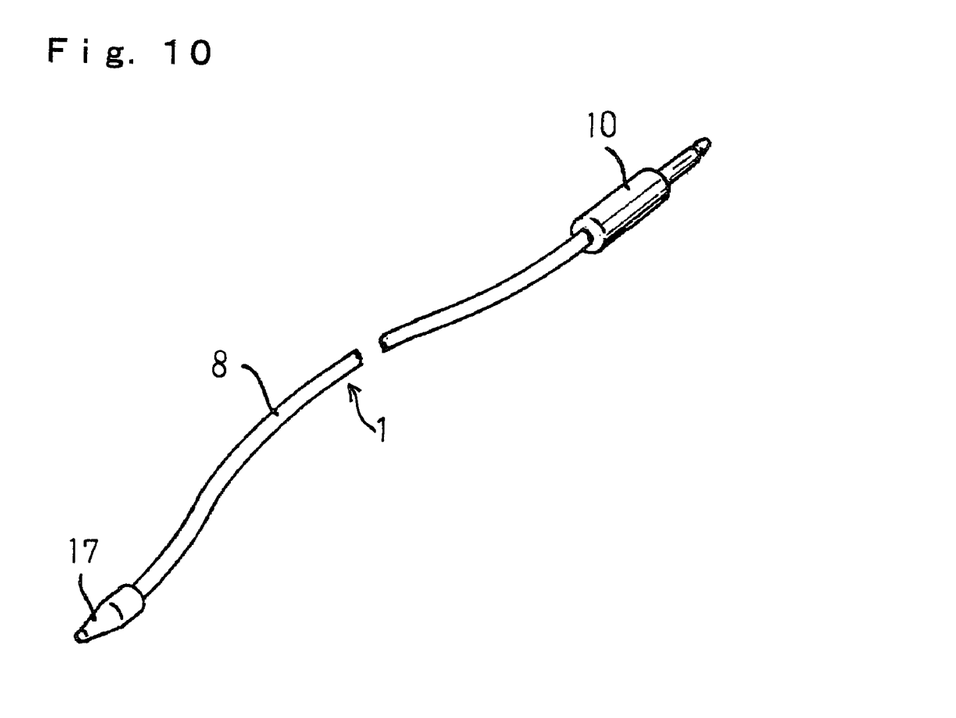
FIG. 10 is a perspective view showing the state before forming the receiver antenna shown in FIG. 9.

FIG. 9 shows the electromagnetic wave receiving section 9 having a flexible conductive loop 16 formed by making the leading end of the antenna lead 8 into the loop with an external diameter which is substantially the same as that of the ignition coil for generating the electromagnetic wave. The loop 16 is formed by the user who manually bends the leading end of the antenna lead 8 with the linear shape into the loop shape with the hand or the finger as shown in FIG. 10.

In the aforementioned example, the electromagnetic wave generated around the ignition coil passes through the loop 16 serving as the coil with the single turn. So the pulse corresponding to the engine ignition timing is induced to the loop 16 at the high level to be output. A reference numeral 17 denotes a cap fit with the end of the loop 16.

Figure 11:
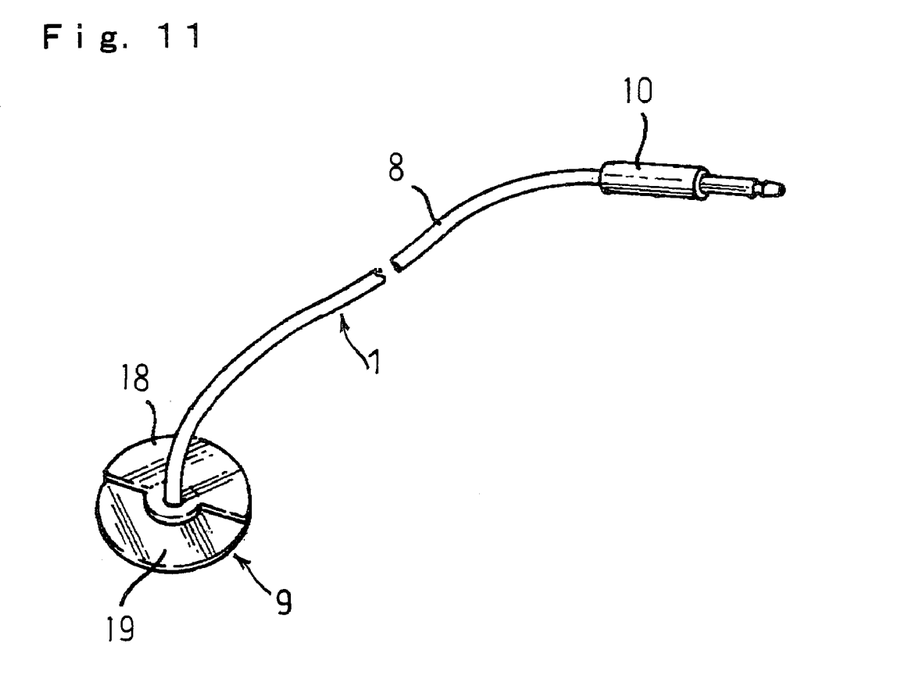
FIG. 11 is a perspective view showing the receiver antenna according to another embodiment of the present invention.

FIG. 11 shows an example of the electromagnetic wave receiving section 9 formed by attaching two semicircle plates 18, 19 each with substantially the same external diameter as that of the ignition coil or the high pressure current generation section 13 for generating the electromagnetic wave to the leading end of the antenna lead 8. Each of those two semicircle plates 18 and 19 is formed of a conductive material. The center of the semicircle plate 18 is electrically and mechanically connected to the leading end of the antenna lead 8. The other semicircle plate 19 is rotatably operated in the range of 180° with respect to the semicircle plate 18 around the center.

Figure 12:
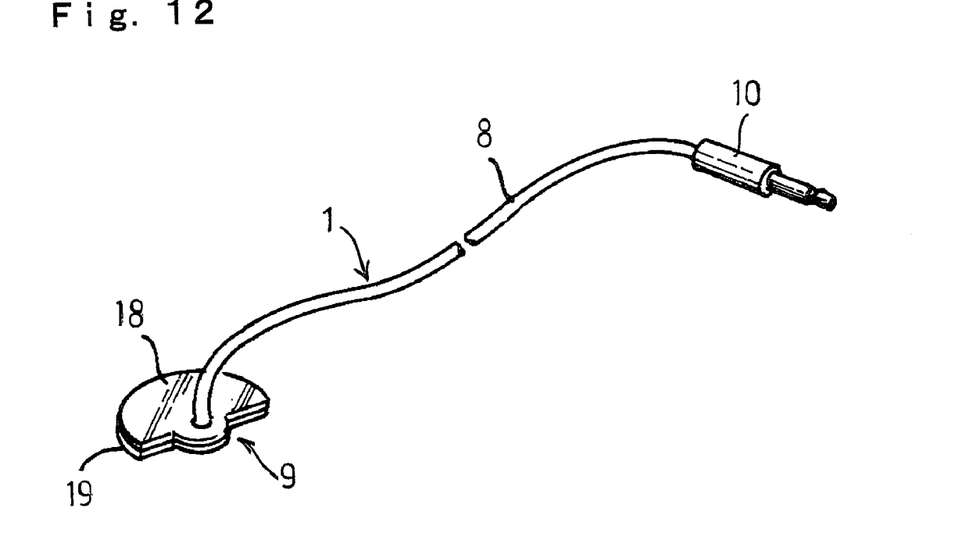
FIG. 12 is a perspective view showing a state before and after the operation of the receiver antenna shown in FIG. 11.

In the structure, the semicircle plate 19 is rotatable with respect to the other semicircle plate 18 at 180° on substantially the same plane. When the semicircle plate 19 is turned at 180° with respect to the semicircle plate 18, they form the circular surface as shown in FIG. 11. Meanwhile, they are fully overlapped to form the semicircle as shown in FIG. 12.

When they form the semicircle, the antenna may be easily stored and carried. Meanwhile, when they form the circular shape, the electromagnetic wave may be captured over a wider range to improve the wave receiving sensitivity as described referring to FIG. 8. The semicircle plate 19 may be turned through direct manual operation of the user, or turned through the arbitrary structure with the known handle or lever.

Figure 13:
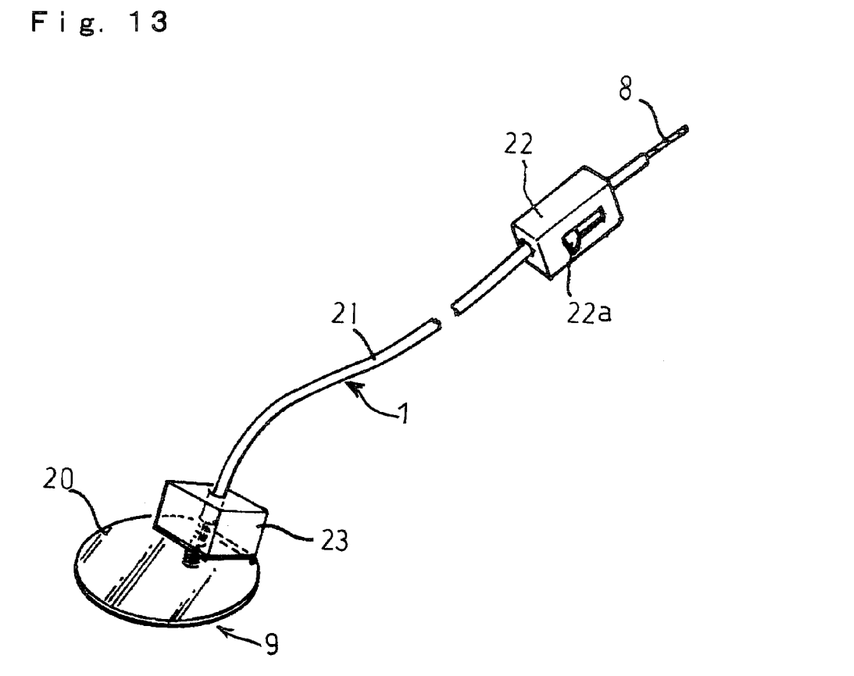
FIG. 13 is a perspective view showing the receiver antenna according to another embodiment of the present invention.

FIG. 13 shows a disk-like conductive plate 20 having the electromagnetic wave receiving section 9 attached to the leading end of the antenna lead 8. The conductive plate 20 is rotatable by operating a lever device 22 at the upper end of a thin tube 21 through which the antenna lead 8 is inserted.

Figure 14:
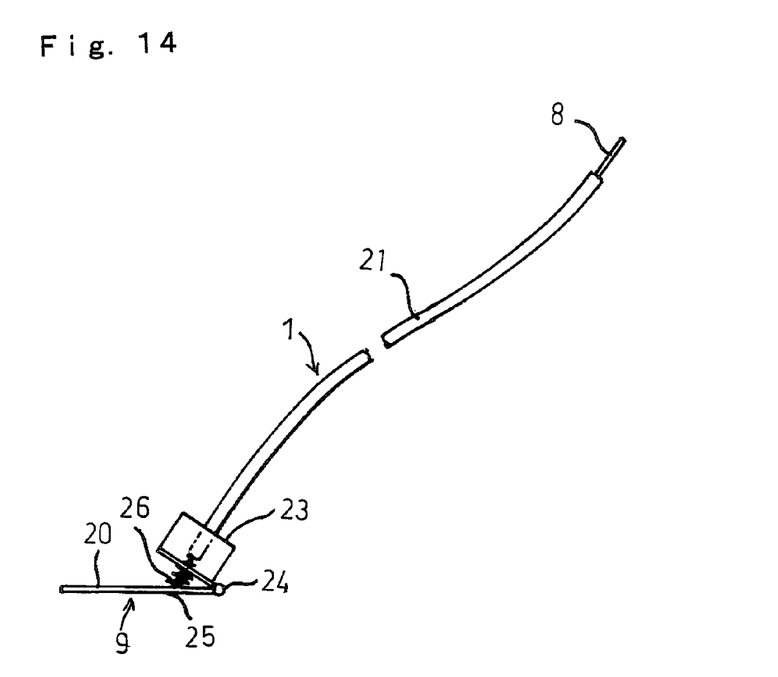
FIG. 14 is a partially enlarged perspective view of the receiver antenna shown in FIG. 13.

In the embodiment, a box-like support frame 23 having a lower portion opened is attached to the lower end of the thin tube 21 as shown in FIG. 14. The conductive plate 20 is partially supported at the lower edge of the support frame 23 rotatably with a hinge shaft 24. The antenna lead 8 is inserted in the thin tube 21, having the lower end supporting the conductive plate 20 partially.

The aforementioned supporting does not have to be performed through fixing, but may be performed in a moveable or a rotatable manner through the structure including a hinge connection 25, or the structure where the end of the antenna lead 8 with a protrusion is inserted into a not shown small hole in the conductive plate 20 so as not to be removed therefrom.

A coil spring 26 is provided between the support frame 23 and the conductive plate 20 in an urging state for opening. The coil spring 26 is inserted to be fit around the leading end of the antenna lead 8. The portion around the upper end of the antenna lead 8 is in the thin tube 21, and connected to the lever device 22.

When the user grips the thin tube 21 with the hand to pull a lever 22a with fingers, the antenna lead 8 within the thin tube 21 is lifted up against the repulsive force of the coil spring 26. Then the conductive plate 20 supported at the leading end of the antenna lead 8 rotates upward at the hinge shaft 24 as the center.

Meanwhile, when the force applied to pull the lever 22a is released or weakened, the repulsive force of the coil spring 26 allows the conductive plate 20 to rotate downward at the hinge shaft 24 as the center. The rotating amount of the conductive plate 20 may be arbitrarily adjusted by operating the lever 22a. Accordingly, the operation of the lever 22a makes it possible to change the position of conductive plate 20 to the direction which allows the electromagnetic wave to be detected with the highest sensitivity.

Figure 15:
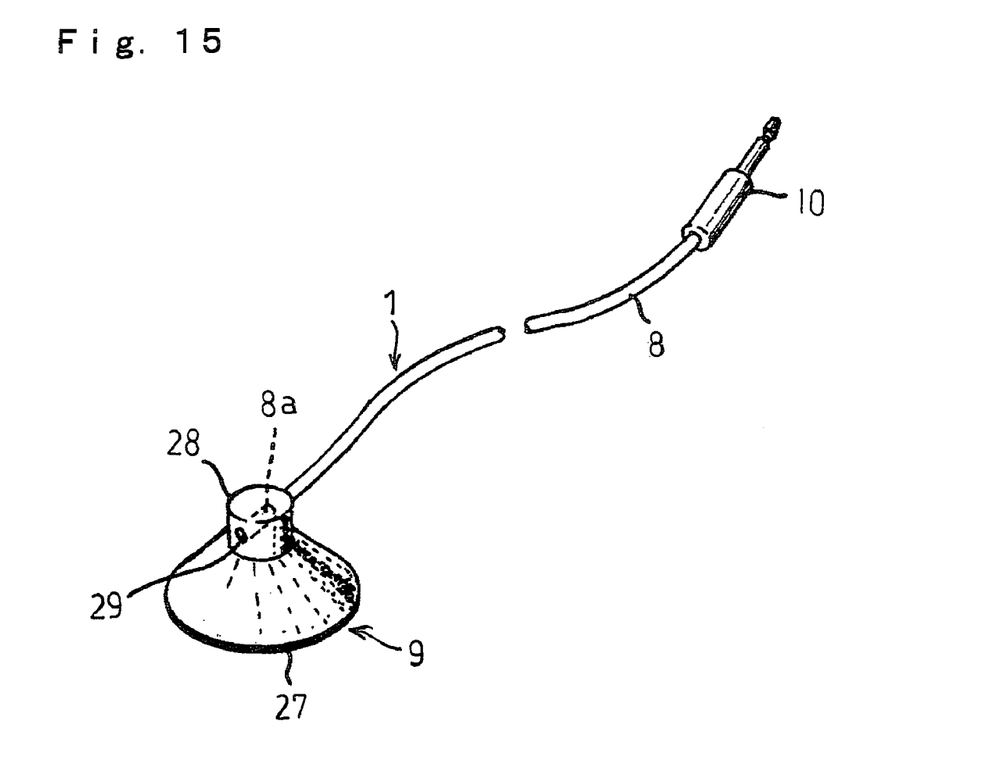
FIG. 15 is a perspective view showing the receiver antenna according to another embodiment of the present invention.

FIG. 15 shows a conductive suction cup 27 formed of a conductive resin or a conductive rubber, which is employed as the electromagnetic wave receiving section 9. The conductive suction cup 27 has a protrusion 28 integrally formed with the outer center portion. A bent portion 8a at the leading end of the antenna lead 8 is inserted into a fixture hole 29 formed in the protrusion 28 so as not to be easily removed.

In the embodiment, the conductive suction cup 27 with the large diameter may be easily stuck to the main body cover or other component of the engine for efficiently receiving the electromagnetic wave. As a result, the antenna lead 8 does not have to be manually supported, resulting in easy measurement of the engine speed. The resultant measurement value may be stabilized.

Figure 16:
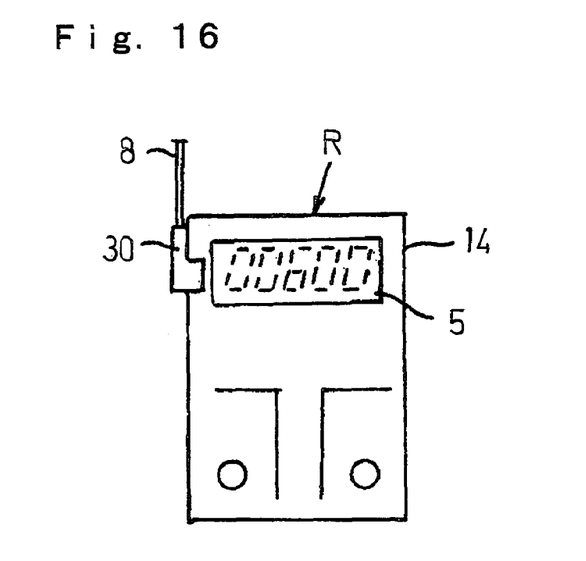
FIG. 16 is an explanatory view showing the state of connection between the antenna lead and the engine rotation detector according to the present invention.
Figure 17:
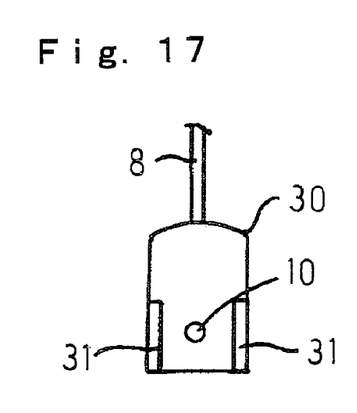
FIG. 17 is a front view showing the structure of an attachment member of the antenna jack according to the present invention.
Figure 18:
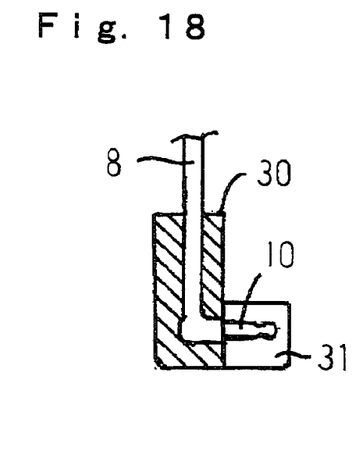
FIG. 18 is a front sectional view showing a mold structure of the antenna jack according to the present invention.

FIG. 16 shows a state where the antenna jack 10 attached to the other end of the antenna lead 8 is connected to the socket (not shown) in the case 14 of the engine rotating meter R. In this case, the antenna jack 10 and the adjacent antenna lead 8 are molded in an L-like plastic fit member 30 so as to be held in the stable state. The attachment member 30 includes a pair of protrusions 31 for elastically clamping or engaging the sides of the case 14 around the socket as shown in FIGS. 17 and 18.

When the antenna jack 10 is inserted into the socket, the attachment member 30 allows the pair of protrusions 31 to clamp the sides of the case 14 under pressure for stably retaining the antenna jack 10 in the socket while preventing the removal therefrom.

The engine rotating meter according to the present invention allows the pulse input to the measurement processing circuit which includes the waveform shaping circuit to be accurately detected constantly by manually performing the optimum adjustment of the measurement level. The detection may be realized with the simple circuit at low costs as the engine rotating meter capable of adjusting the electromagnetic wave input level into the level suitable for the measurement of the engine speed.

The antenna includes the electromagnetic wave receiving section with an electromagnetic wave receiving surface larger than any other area so as to be moved adjacent to the engine ignition system, and the antenna lead having the leading end connected to the electromagnetic wave receiving section to transmit the signal derived from the induction detection. The use of the aforementioned antenna allows the detection of the electromagnetic wave with high sensitivity at the leading end of the antenna lead by moving the electromagnetic wave receiving section to be adjacent to the ignition plug or the high pressure current generation section, thus realizing the accurate measurement of the engine speed.

The invention claimed is:

1. An engine rotating meter comprising:
 a wave receiving section which receives an electromagnetic wave generated by an ignition system of an engine, the wave receiving section configured to be positioned at or near components of the ignition system;
 an antenna which induces and detects the electromagnetic wave generated by the ignition system and received by the wave receiving section, the antenna being electrically coupled to the wave receiving section;
 a measurement processing circuit which measures an engine speed based on a pulse formed from the electromagnetic wave detected by the antenna;
 a level adjusting circuit, coupled to an intermediate point of a circuit between the antenna and the measurement processing circuit, to adjust a level of the pulse; and
 a manual input mechanism disposed on a main body of the engine rotating meter which enables manual adjustments to the level adjusting circuit to maintain the pulse to a level suitable for performing the measurement processing of the engine speed.

2. The engine rotating meter according to claim 1, wherein the level adjusting circuit comprises variable resistance connected to a point between the circuit which connects the antenna and the measurement processing circuit, and a ground.

3. The engine rotating meter according to claim 1, wherein the level adjusting circuit comprises a variable capacitor connected to a point between the circuit which connects the antenna and the measurement processing circuit, and a ground.

4. The engine rotating meter according to claim 1, wherein the level adjusting circuit comprises a variable resistance and a capacitor which are connected to a point between the circuit which connects the antenna and the measurement processing circuit, and a ground.

5. The engine rotating meter according to claim 1, wherein the electromagnetic wave receiving section has a receiving surface larger than an antenna lead, the antenna lead having a leading end connected to the electromagnetic wave receiving section to lead a signal derived from an induction detection.

6. The engine rotating meter according to claim 5, wherein the electromagnetic wave receiving section is formed of a conductive plate attached to the leading end of the antenna lead.

7. The engine rotating meter according to claim 5, wherein the electromagnetic wave receiving section is formed by shaping the leading end of the antenna lead into a loop with a diameter substantially the same as that of an ignition coil for generating the electromagnetic wave.

8. The engine rotating meter according to claim 5, wherein the electromagnetic wave receiving section is attached to the leading end of the antenna lead such that an area of an electromagnetic wave receiving surface is adjustable.

9. The engine rotating meter according to claim 5, wherein the electromagnetic wave receiving section is attached to the leading end of the antenna lead such that an angle in a wave receiving direction is adjustable.

10. The engine rotating meter according to claim 5, wherein the electromagnetic wave receiving section is formed of a conductive suction cup attached to the leading end of the antenna lead.

11. The engine rotating meter according to claim 5, wherein an antenna jack connectable to a socket formed in a body of the engine rotating meter for inputting a signal at an end of the antenna lead opposite an end where the electromagnetic wave receiving section is provided.

\* \* \* \* \*